United States Patent
Andrews et al.

(10) Patent No.: US 12,395,599 B2
(45) Date of Patent: Aug. 19, 2025

(54) SECURE STATIC FACSIMILES OF DIGITAL INFORMATION BY AN INFORMATION HANDLING SYSTEM

(71) Applicant: Dell Products L.P., Round Rock, TX (US)

(72) Inventors: Maxwell S. Andrews, Kennett Square, PA (US); Charles D. Robison, Buford, GA (US)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 18/424,317

(22) Filed: Jan. 26, 2024

(65) Prior Publication Data
US 2025/0247488 A1  Jul. 31, 2025

(51) Int. Cl.
*H04N 1/44* (2006.01)
*H04L 9/30* (2006.01)
*H04N 1/32* (2006.01)

(52) U.S. Cl.
CPC ............ *H04N 1/4486* (2013.01); *H04L 9/30* (2013.01); *H04N 1/32149* (2013.01); *H04N 1/444* (2013.01)

(58) Field of Classification Search
CPC .. H04N 1/4486; H04N 1/32149; H04N 1/444; H04L 9/30
See application file for complete search history.

(56) References Cited

U.S. PATENT DOCUMENTS

| | | | | |
|---|---|---|---|---|
| 6,157,846 | A * | 12/2000 | Manning | H04N 1/324 |
| | | | | 455/414.1 |
| 7,239,406 | B1 * | 7/2007 | Piersol | H04N 1/00209 |
| | | | | 358/1.15 |
| 7,796,285 | B2 * | 9/2010 | Robbins | H04N 1/32133 |
| | | | | 358/1.15 |
| 11,409,880 | B2 * | 8/2022 | Huang | G06F 21/575 |
| 2007/0083614 | A1 * | 4/2007 | Bobo, II | H04M 3/53333 |
| | | | | 709/217 |
| 2007/0146804 | A1 * | 6/2007 | Mehta | H04N 1/00214 |
| | | | | 358/405 |
| 2008/0162304 | A1 * | 7/2008 | Ourega | G06Q 30/0619 |
| | | | | 705/26.4 |
| 2009/0005115 | A1 * | 1/2009 | Chan | H04N 1/00315 |
| | | | | 455/557 |

\* cited by examiner

*Primary Examiner* — Yonas A Bayou
(74) *Attorney, Agent, or Firm* — Norton Rose Fulbright US LLP (57) ABSTRACT

A method for securely providing a second user with access to a static facsimile captured by a first user is provided. An embodiment of the method includes receiving an indication, associated with a first user, to capture a static facsimile of digital content; capturing the static facsimile of the digital content in accordance with the indication; determining an encrypted static facsimile by encrypting the static facsimile; and transmitting the encrypted static facsimile and access instructions to an access control device for providing a second user with access to the static facsimile. The access instructions define conditions of the access provided to the second user.

20 Claims, 6 Drawing Sheets

SECURE STATIC FACSIMILES OF DIGITAL INFORMATION BY AN INFORMATION HANDLING SYSTEM

FIELD OF THE DISCLOSURE

The instant disclosure relates to information handling systems. More specifically, portions of this disclosure relate to capturing secure static facsimiles of data for transmittal.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Sharing information with collaborators over a communications network is a fundamental and essential requirement of modern teams, and a poorly functioning information exchange mechanism can impede all other tasks a team wishes to accomplish. With the growth of cloud-based tools, not only must information security standards be maintained, but a license agreement must also be negotiated and executed for each new user granted permissions to view certain digital content. This license adjudication can introduce significant delays in approving access to the digital content and can result in significant cost burdens through the creation of term subscriptions simply to grant access to a small number of content items for a short time period. As a result, these barriers often lead users to resort to workarounds such as capturing a static facsimile (e.g., screen capture, screenshot, snip, etc.) of the digital content and sharing the static facsimile with a collaborator that does not have permission under a license agreement to view the digital content. Because a collaborator may be outside of the user's company or country, these workarounds create substantial risks for data breaches and loss of protected information.

SUMMARY

A method of capturing a static facsimile of digital information from a hosting source and securely sharing that static facsimile with a designated user of a receiving source according to predetermined data security measures is provided. For example, the hosting source may encrypt the static facsimile and grant an access key with specific attributes to the designated user, with the specific attributes indicating what the designated user is authorized to do with the static facsimile. In this way, the designated user is able to verify their identity as someone who is able to view the static facsimile of the digital information by using the access key and is limited in their interactions with the static facsimile to only what they are authorized to do. In some aspects, a digital watermark may be attached to the encrypted static facsimile so that if any person were to create a secondary digital or analog capture of the static facsimile, that secondary capture could be audited based on a computer vision analysis of the visual information to determine the responsible party.

In an example scenario, consider Alice and Bob. Alice is an employee of Company A and Bob is a contractor for Company A that is employed by Company B. Alice needs to send Bob an engineering diagram under development, since Bob will be assisting to validate the design. The engineering diagram is produced with a cloud-based diagramming tool which requires a subscription license to access. Bob, reporting to a different manager and company than Alice, does not currently have access to the cloud-based diagramming tool, preventing him from completing his task. Conventionally, Bob must now lobby his manager and IT helpdesk for a subscription license to the application, which may take hours, days, or weeks depending on the policies and procedures required, if the request is even approved at all. This technological barrier to securely share digital information can significantly impair collaboration between Alice and Bob.

With conventional digital tools of a typical information handling system at her disposal, Alice may decide to avoid these cumbersome administrative delays by opting to exfiltrate a view of the target information of the engineering diagram from the diagramming tool using internal (e.g., export or download function) or external (e.g., screenshot) commands. Doing so renders a static view of the target information, free from data security access restrictions, that can now be easily transferred to Bob via myriad protocols (e.g., email). By avoiding the licensing issue, however, Alice and Bob have created an information security issue. The confidential information from the engineering diagram now exists as an unsecure facsimile that has no information protection standards applied to it. If a malicious attacker were to gain access to either Alice or Bob's computers, physically or remotely, the attacker would have unfettered access to the static rendering of the confidential information. Alice also has no control over whether Bob may himself become a witting or unwitting malicious actor, engaging in secondary transfers of the confidential information to other parties. Thus, conventional digital tools of a typical information handling system can enable the loss of confidential information for Company A.

With an information handling system able to perform operations that carry out the present method at her disposal, however, Alice instead invokes a command within her workspace platform to create a secure static facsimile of the confidential engineering diagram. Doing so executes a workflow automation whereby a static facsimile of the engineering diagram is captured and then hosted in a secure access-controlled service within which Bob may be granted specific rights to view specific portions of the content for a specific time period. The workflow automation may, in some aspects, apply any due redactions to the confidential engineering diagram based on Bob's granted rights. In some aspects, the workflow automation may apply a steganographic watermark to the static facsimile, such that should Bob or any other person create a digital or analog secondary capture of the static facsimile and that secondary capture is found in a non-approved location, the secondary capture could be audited based on a computer vision analysis of the visual information to determine the responsible party. Once the engagement between Alice and Bob has concluded, Bob's access to the static facsimiles in the secure access-controlled service can then be revoked, which reduces the potential for Bob to wittingly or unwittingly compromise the confidential information from the engineering diagram from that point on.

Since the provided method is based on a facsimile and not a "carbon copy", no license adjudication is necessary for Bob, thereby improving Bob's speed of access to the digital information and reducing costs and software management overhead of both Company A and Company B. In this way, the method improves the functioning of information security processes of an information handling device and thereby improves the user experience. For example, the method described herein retains the ease of use of capturing a static facsimile of digital content while creating an information secure paradigm within which to share the static facsimile.

According to one embodiment, a method includes receiving an indication, that is associated with a first user, to capture a static facsimile of digital content; capturing the static facsimile of the digital content in accordance with the indication; determining an encrypted static facsimile by encrypting the static facsimile; and transmitting the encrypted static facsimile and access instructions to an access control device for providing a second user with access to the static facsimile. The access instructions define conditions of the access provided to the second user.

In certain embodiments, encrypting the static facsimile includes cryptographically signing the static facsimile with a private key that is associated with a public key, which associated with the second user.

In certain embodiments, the conditions include a time at which the access provided to the second user is revoked.

In certain embodiments, the conditions include a portion of the static facsimile to which the second user is denied access.

In certain embodiments, the method further includes applying a watermark to the static facsimile prior to transmitting the encrypted static facsimile.

According to another embodiment, an information handling system may include a memory and a processor in communication with the memory. The processor is configured to perform operations corresponding to the steps of the various embodiments of the method.

According to another embodiment, the method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
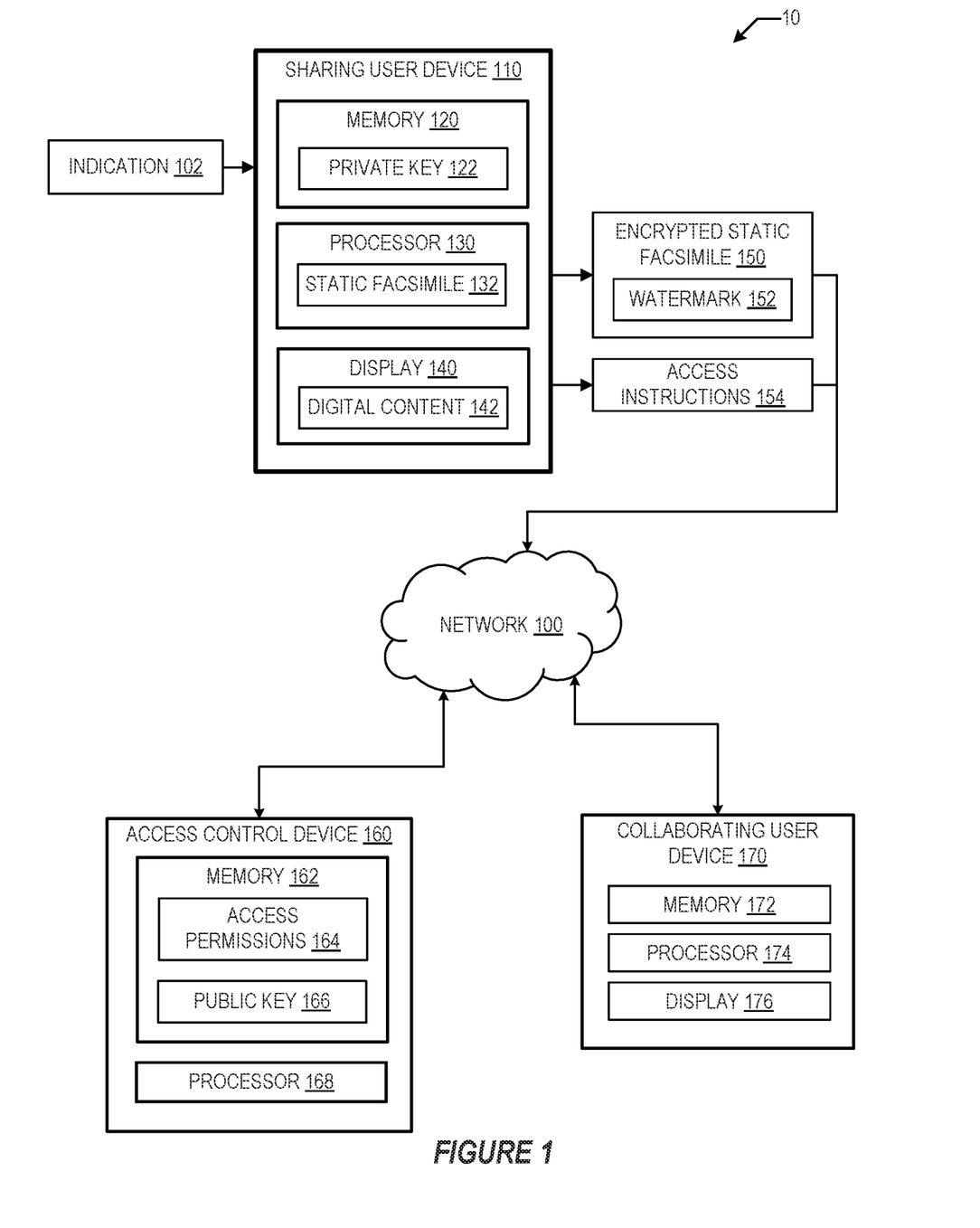
FIG. 1 is a block diagram of a system for securely providing access to static facsimiles according to some embodiments of the disclosure.

FIG. 1 illustrates an example computer network 10 (e.g., a telecommunications network) that may be used to implement various aspects of the present application. Generally, the computer network 10 includes various devices of a system communicating and functioning together in the gathering, transmitting, and/or requesting of data related to securely sharing, with defined access controls, a static facsimile of digital content between a sharing user and a collaborating user over the computer network 10. As used herein, a "static facsimile" may refer to a screen capture, screenshot, snapshot, snip, screen buffer, or other suitable image-based or non-image-based facsimile of digital content displayed on a screen. For example, artificial intelligence may be used to extract digital content out of the source of a document or webpage to generate a non-image-based snapshot of the digital content.

As illustrated, a communications network 100 allows for communication in the computer network 10. The communications network 100 may include one or more wireless networks such as, but not limited to one or more of a Local Area Network (LAN), Wireless Local Area Network (WLAN), a Personal Area Network (PAN), Campus Area Network (CAN), a Metropolitan Area Network (MAN), a Wide Area Network (WAN), a Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. The communications network 100 may also include wired networks.

Figure 4A:
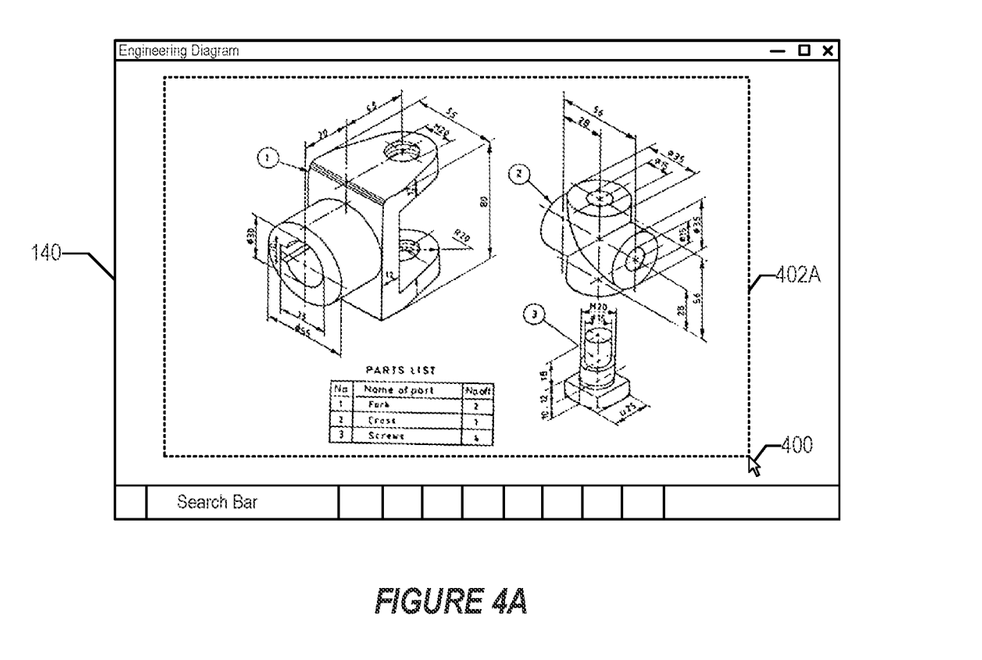
FIGS. 4A and 4B are depictions of a static facsimile being captured of digital content displayed on a screen according to some embodiments of the disclosure.

In the computer network 10, a sharing user device 110 may receive an indication 102 to capture a static facsimile 132 of digital content 142 that is displayed on a display 140 (e.g., screen) of the sharing user device 110. The sharing user device 110 further includes a memory 120 in communication with a processor 130. The indication 102 may be the result of an action by a sharing user 200 (FIG. 2) that uses the sharing user device 110. For example, FIG. 4A illustrates the display 140 showing digital content of an engineering diagram and depicts the sharing user 200 generating an indication 102 for a processor 130 of the sharing user device 110 to capture a static facsimile 132 of the digital content 142 that is within the dashed box 402A. More specifically, the sharing user 200 is utilizing a snipping tool in this example to capture the digital content 142, which includes a click-and-drag operation to generate the dashed box 402A with the cursor 400, and when the sharing user 200 releases the "click", the indication 102 is generated for the processor 130 to capture a static facsimile 132 of the digital content 142 that is within the dashed box 402A. In this example, the entirety of the engineering diagram, but not the entirety of what is displayed on the display 140, is included in the digital content 142.

Figure 4B:
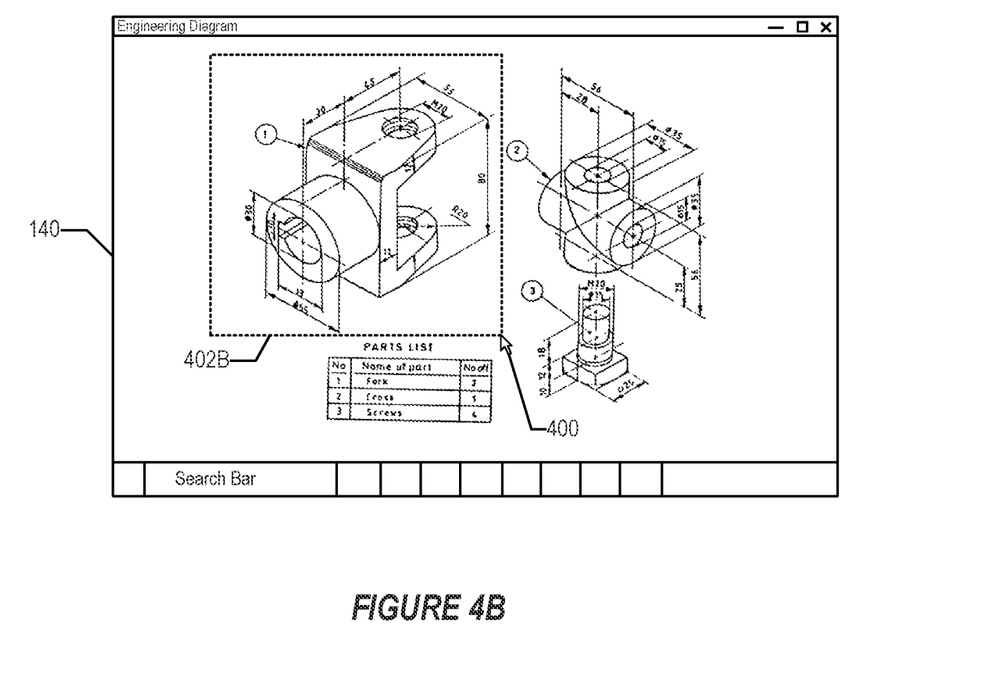

In another example, as shown in FIG. 4B, the sharing user 200 may desire to capture and share only a specific portion of the engineering diagram within the dashed box 402B, which is generated in a way similar to the dashed box 402A. In this example, only the specific portion of the engineering diagram within the dashed box 402B is included in the digital content 142. In another example still, the sharing user 200 may desire to capture and share all of the digital content shown on the display 140 and may invoke a "Print Screen" command which serves as an indication 102 for the processor 130 to capture a static facsimile 132 of all that is shown on the display 140. In this example, all that is shown on the display 140 is included in the digital content 142.

Subsequent to capturing the static facsimile 132 of the digital content 142 according to the indication 102, the processor 130 encrypts the static facsimile 132. For example, in some aspects, the processor 130 may cryptographically sign the static facsimile 132 using a private key 122 that is part of a key pair that includes the private key 122 and a public key 166. In some aspects, the processor 130 may apply a watermark 152 (e.g., a steganographic watermark) to the static facsimile 132. For example, the watermark 152 may be a globally unique identifier (GUID). In various aspects, the watermark 152 may be embedded into the static facsimile 132, stored within the header of the static facsimile 132, or both. The processor 130 transmits the encrypted static facsimile 150, that may include the watermark 152, over the communications network 100 to an access control device 160.

The processor 130 may additionally transmit access instructions 154 to the access control device 160. The access instructions 154 define conditions of the access that is to be provided to a collaborating user 202 (FIG. 2) with respect to the static facsimile 132. For example, the access instructions 154 may include a time period during which the collaborating user 202 is provided access to the static facsimile 132. In such an example, the access afforded to the collaborating user 202 is revoked at a conclusion of the time period. In another example, the access instructions 154 may include one or more portions of the static facsimile 132 to which the collaborating user 202 is denied access. In another example, the access instructions 154 may include another suitable condition included in an information security policy, such as the information security policy of the organization at which the sharing user 200 is employed.

Figure 4C:
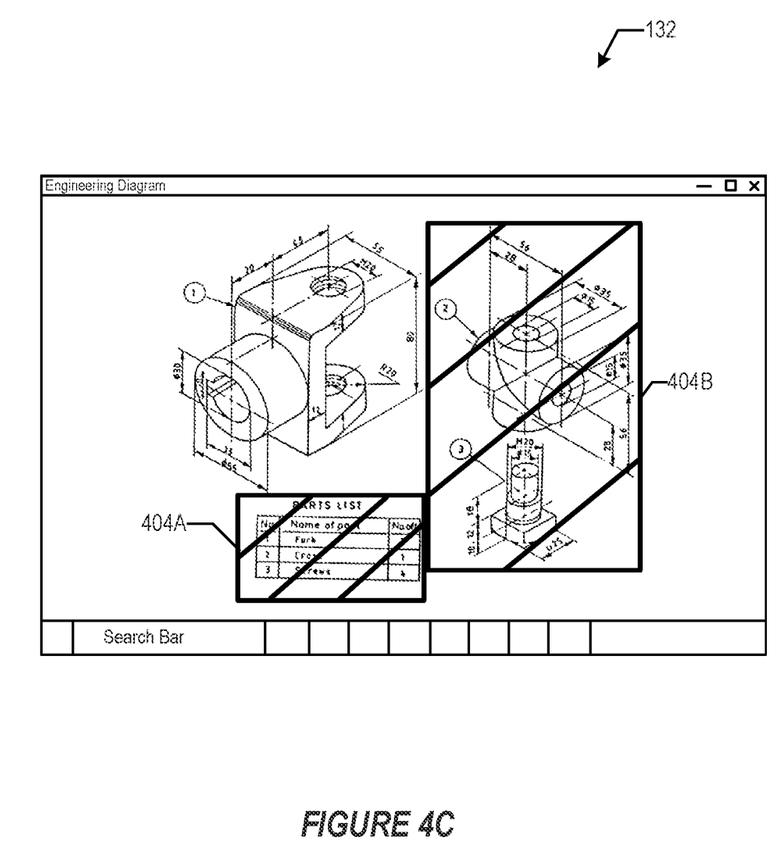
FIG. 4C is a depiction of certain portions of a static facsimile being redacted to maintain confidentiality according to some embodiments of the disclosure.

The access control device 160 (e.g., a cloud-based server) includes a memory 162 in communication with a processor 168. Based on the access instructions 154 received, the processor 168 inputs or adjusts access permissions 164 stored in the memory 162 for the collaborating user 202. For example, the processor 168 may input or adjust an entry in a database that associates the collaborating user 202 with the time period indicated in the access instructions 154 during which the collaborating user 202 is granted access to the static facsimile 132. In another example, the processor 168 may redact the one or more portions of the encrypted static facsimile 150 that are indicated in the access instructions 154 to remain confidential from the collaborating user 202. For example, FIG. 4C shows a static facsimile 132 of all that is displayed on the display 140 depicted in FIGS. 4A and 4B and further shows redaction boxes 404A, 404B that surround the portions of the static facsimile 132 that are redacted so as to remain confidential from the collaborating user 202. From the perspective of the collaborating user 202, in various examples, the collaborating user 202 may see black boxes covering the redacted portions or the redacted portions may be removed entirely such that the collaborating user 202 sees the background behind those redacted portions.

In some aspects, the access control device 160 stores the public key 166. For example, the processor 168 of the access control device 160 may generate the key pair including the private key 122 and the public key 166, and may transmit the private key 122 to the sharing user device 110 at some point prior to the processor 130 encrypting the static facsimile 132. Similarly, the processor 168 may transmit the public key 166 to a collaborating user device 170 at some point prior to transmitting the encrypted static facsimile to the collaborating user device 170. Alternatively, the processor 168 may transmit the public key 166 to the collaborating user device 170 at the same time as transmitting the encrypted static facsimile 150.

The collaborating user device 170 includes a memory 172 in communication with a processor 174. The collaborating user 202 may use the collaborating user device 170 to decrypt the encrypted static facsimile 150 and view the static facsimile 132 on a display 176 of the collaborating user device 170. For example, the public key 166 may be used to decrypt the encrypted static facsimile 150 and in the process verify the identity of the collaborating user 202. The collaborating user 202 can view the static facsimile 132 until the access for the collaborating user 202 is revoked.

It is noted that each of the sharing user device 110, the access control device 160, and the collaborating user device 170 may be or include an information handling system.

Figure 2:
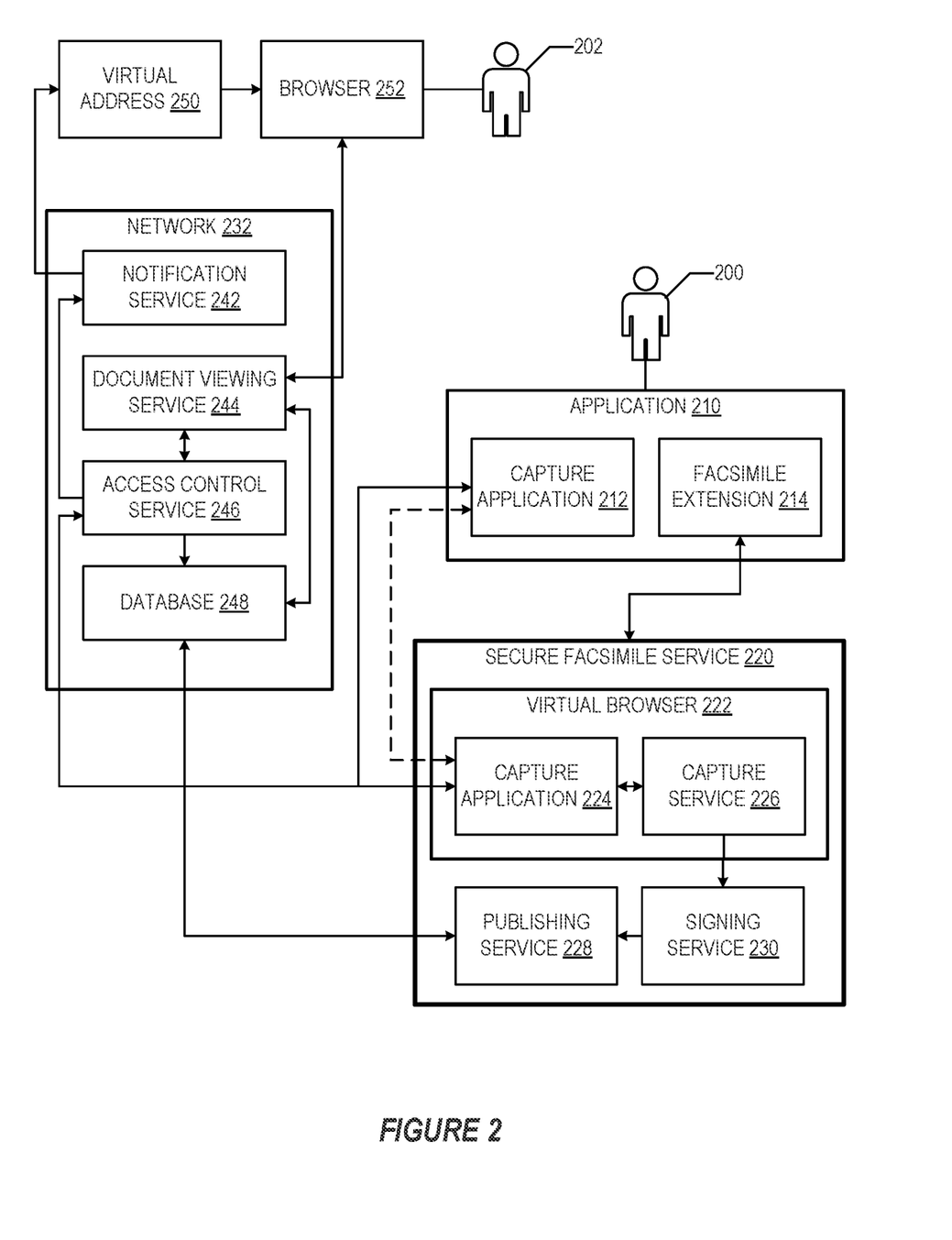
FIG. 2 is a flow diagram of processes for securely providing access to static facsimiles according to some embodiments of the disclosure.

FIG. 2 is a flow diagram of software processes for implementing an example method with the computer network 10 for the sharing user 200 to securely provide the collaborating user 202 with access to static facsimiles. The sharing user 200 intends to share a document with the collaborating user 202, but the collaborating user 202 does not have a license for the application or service used to author the document. As such, the sharing user 200, using the sharing user device 110, invokes a secure facsimile capture tool, which may be implemented as, for example, a capture application 212 executed in an application 210 (e.g., a browser), a facsimile extension 214 for a secure facsimile service 220 in the application 210, the secure facsimile service 220 within an operating system of the sharing user device 110, or a capture application 212 executed in a virtual browser 222 of the secure facsimile service 220. In at least some aspects, invocation of the facsimile extension 214 or the secure facsimile service 220 may be remapped to conventional screen-capture shortcuts, such that when the sharing user 200 attempts to create a screen capture, the sharing user 200 is prompted to use the capture application 212, the facsimile extension 214, the secure facsimile service 220, or the capture application 224. The capture application 212, the facsimile extension 214, the secure facsimile service 220, or the capture application 224 is granted privileges to interact with the application 210 hosting the document on the behalf of the sharing user 200.

In at least some aspects, if the application 210 has a cognizable automation interface, then an export automation may be implemented. Otherwise, in these aspects, if no cognizable automation interface exists with the application 210, then a visual capture automation may be implemented. Whether the export automation workflow or the visual capture automation workflow is executed by the capture application 212, the facsimile extension 214, the secure facsimile service 220, or the capture application 224, the execution yields a static facsimile (e.g., static facsimile 132) of the document. The static facsimile 132 is provided to a signing service 230 subcomponent of the secure facsimile service 220. In various aspects, the signing service 230 executes a hashing or other fingerprinting process upon the digital content 142 of the static facsimile 132. The signing service 230 encrypts the static facsimile 132. For example, the signing service 230 may cryptographically sign the static facsimile 132 with the private key 122 and attach the signature to a header of the static facsimile 132. In at least some aspects, a GUID is generated and steganographically embedded as a watermark into the static facsimile 132 and/or stored within the header of the static facsimile 132.

The signing service 230 provides the encrypted static facsimile 150 to a publishing service 228, which publishes the encrypted and watermarked static facsimile 132 (e.g., the encrypted static facsimile 150) to a database 248 of a network 232. The publishing service 228 may also transmit an instruction (e.g., access instructions 154) to an access control service 246 of the network 232. The access control service 246 adjusts permissions for the static facsimile 132 in the database 248, thereby creating an access authorization for the collaborating user 202 according to the access instructions 154 and predetermined information security policies, such as information security policies of the organization that employs the sharing user 200. In some aspects, the predetermined information security policies may be embedded within the static facsimile 132. The access control service 246 may call a notification service 242 to notify the collaborating user 202 that access has been granted to the static facsimile 132 for the collaborating user 202. The notification service sends a message (e.g., email) to the collaborating user 202 at a virtual address 250 (e.g., email address) provided by the sharing user 200.

The collaborating user 202 may click a link in the message and provide identity confirmation, such as by using the public key 166 to decrypt the encrypted static facsimile 150. At this point, the collaborating user 202 can view the static facsimile 132 in a browser 252 on the collaborating user device 170, with the static facsimile being streamed from a document viewing service 244.

In response to an automatic trigger (e.g., a time period elapsing) or a manual indication, the access afforded to the collaborating user 202 may be revoked. In such a case, the access control service 246 may reduce the permissions granted to the collaborating user 202 with respect to the static facsimile 132. If the collaborating user 202 were to subsequently attempt to view the static facsimile 132 in the document viewing service 244, access would be denied. Additionally, if at any point the collaborating user 202 attempts to exfiltrate an unauthorized copy of the static facsimile 132, such as via a screenshot or mobile camera capture, the GUID steganographically embedded into the static facsimile 132 and/or stored within the header of the static facsimile 132 can trace the unauthorized copy back to the collaborating user 202 if the unauthorized copy is ever found in a non-approved location.

Figure 3:
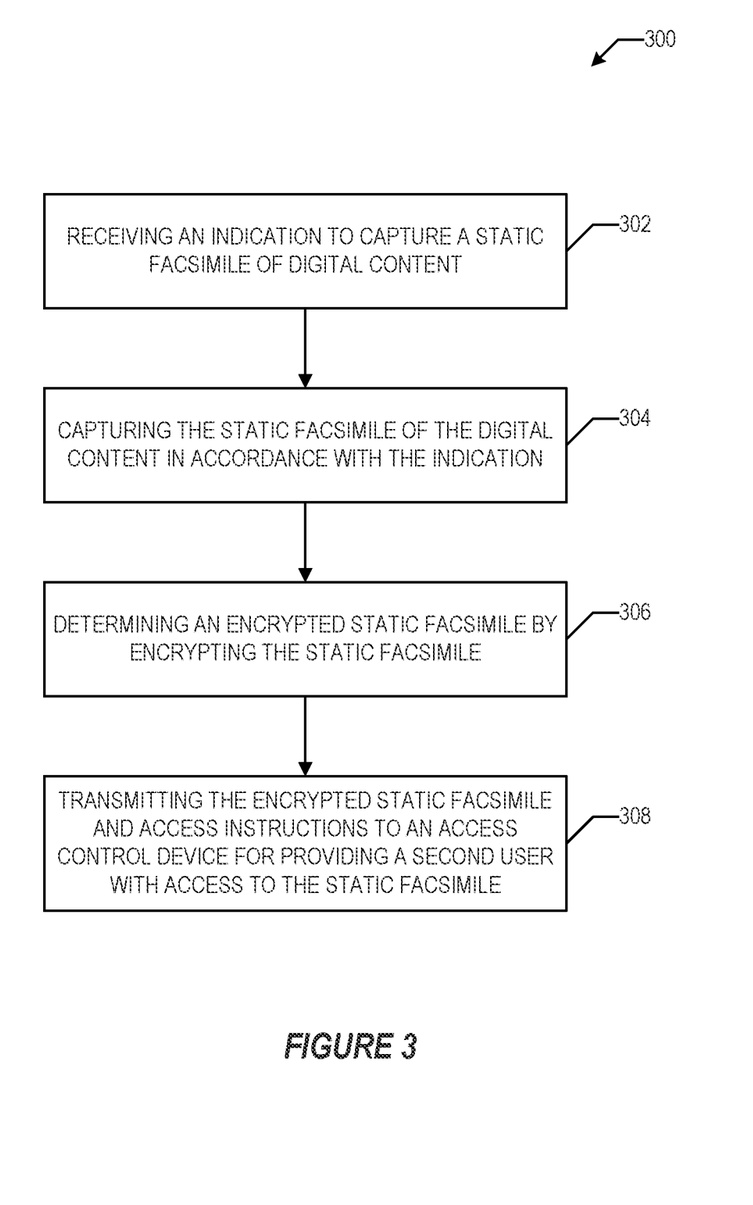
FIG. 3 is a flow chart of a method for securely providing access to static facsimiles according to some embodiments of the disclosure.

FIG. 3 is a flow chart of a method 300 for securely providing a second user with access to a static facsimile captured by a first user. At 302, the method 300 includes receiving an indication (e.g., indication 102) to capture a static facsimile (e.g., static facsimile 132) of digital content (e.g., digital content 142). The indication 102 is associated with a first user (e.g., sharing user 200). For example, the sharing user 200 may interact with the sharing user device 110 to indicate capture of the static facsimile 132 and the processor 130 of the sharing user device 110 receives that indication 102. In some aspects, the digital content 142 of which a static facsimile is captured encompasses all digital content that is displayed on a display (e.g., display 140) of the sharing user device 110. In other aspects, the digital content 142 of which a static facsimile is captured is a portion less than all of the digital content displayed on the display 140. For example, the sharing user 200 may use a snipping tool to capture a specific portion (e.g., the digital content 142) of the digital content displayed on the display 140, as depicted in FIGS. 4A and 4B.

At 304, the static facsimile 132 of the digital content 142 is captured in accordance with the indication 102. In some aspects, if upon receiving the indication 102, an application hosting the digital content 142 has an automation interface, then the static facsimile 132 is captured via an export automation, otherwise the static facsimile 132 is captured via a visual capture automation.

At 306, an encrypted static facsimile (e.g., encrypted static facsimile 150) is determined by encrypting the static facsimile 132. In some aspects, encrypting the static facsimile 132 includes cryptographically signing the static facsimile 132 with a private key (e.g., private key 122) that is associated with a public key (e.g., public key 166). In such aspects, a second user (e.g., collaborating user 202) is associated with the public key 166. In some aspects, method 300 may include applying a watermark (e.g., watermark 152) to the static facsimile 132 prior to transmitting the encrypted static facsimile 150. In an example of such aspects, the watermark 152 is a stenographic watermark.

At 308, the encrypted static facsimile 150 and access instructions (e.g., access instructions 154) are transmitted to an access control device (e.g., access control device 160) for providing the collaborating user 202 with access to the static facsimile 132. The access instructions 154 define conditions of the access provided to the collaborating user 202. For example, in some aspects, the conditions may include a time at which the access provided to the collaborating user 202 is revoked. In another example, the conditions may include a portion (e.g., associated with redaction boxes 404A, 404B) of the static facsimile 132 to which the collaborating user 202 is denied access.

These example embodiments describe and illustrate various aspects of implementing, with an information handling system, techniques for securely sharing, with defined access controls, a static facsimile of digital content between the information handling system and a second information handling system over a computer network. These techniques improve the technical field of digital information security by using operations rooted in information processing technology to reduce the likelihood of the loss of protected information. By encrypting a static facsimile of digital content, which would otherwise be unprotected from data breaches and other types of protected information loss, and transmitting the encrypted static facsimile with predefined access controls, the techniques reduce the likelihood that an individual other than the individual designated in the predefined access controls gains access to the protected information in the static facsimile. And in some aspects, the inclusion of a computer-implemented watermark with the static facsimile can identify the source of the leak should the static facsimile be found in a location unauthorized by the predefined access controls. Typical techniques in the technical field of digital information security fail to provide the level of data protection afforded by the present techniques.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 5.

Figure 5:
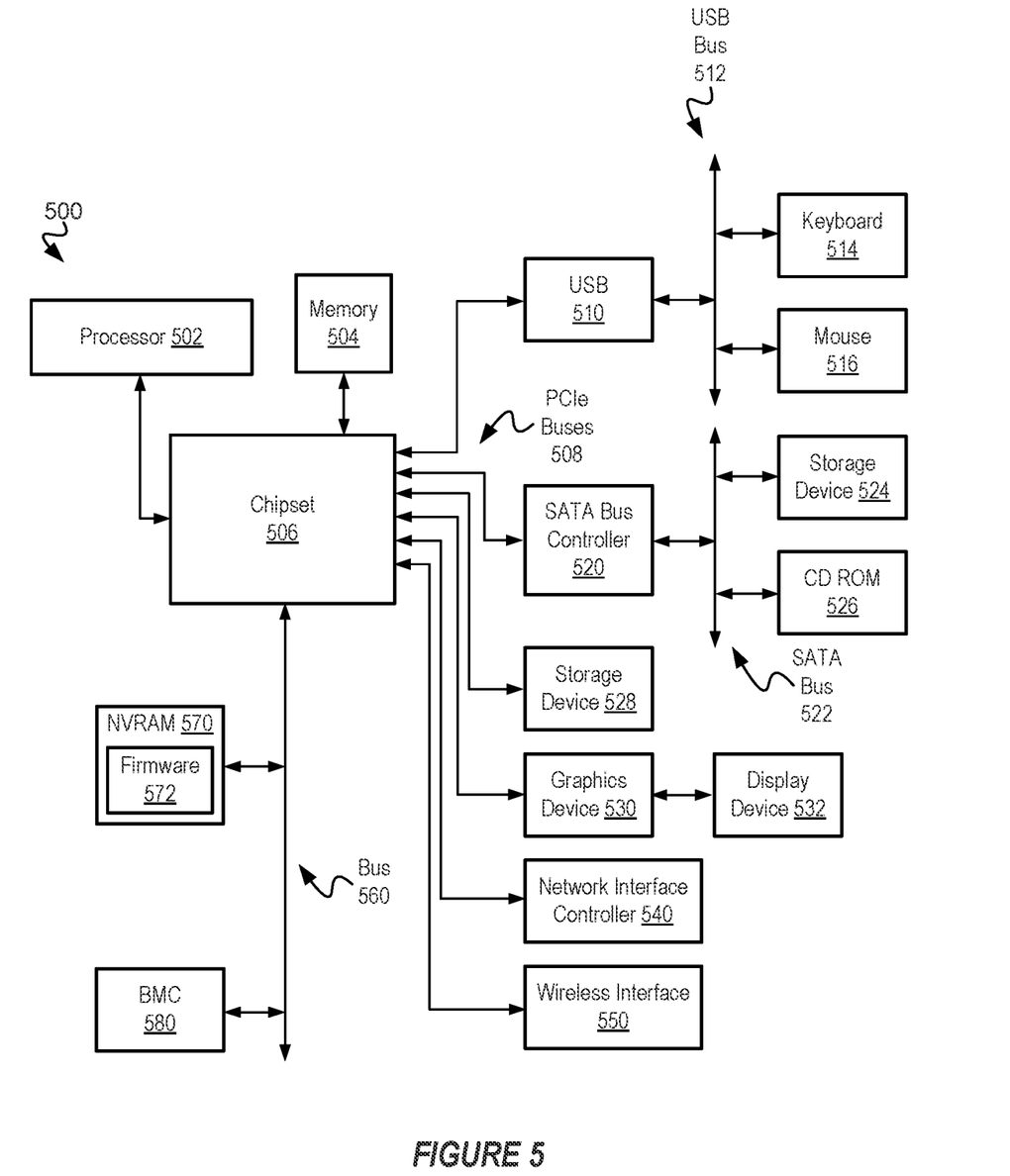
FIG. 5 is a schematic block diagram of an example information handling system according to some embodiments of the disclosure.

FIG. 5 illustrates an example information handling system 500. Information handling system 500 may include a processor 502 (e.g., a central processing unit (CPU)), a memory (e.g., a dynamic random-access memory (DRAM)) 504, and a chipset 506. In some embodiments, one or more of the processor 502, the memory 504, and the chipset 506 may be included on a motherboard (also referred to as a mainboard), which is a printed circuit board (PCB) with embedded conductors organized as transmission lines between the processor 502, the memory 504, the chipset 506, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 502, the memory 504, the chipset 506, and/or other components may be organized as a System on Chip (SoC).

The processor 502 may execute program code by accessing instructions loaded into memory 504 from a storage device, executing the instructions to operate on data also loaded into memory 504 from a storage device, and generate output data that is stored back into memory 504 or sent to another component. The processor 502 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 502 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 506 may facilitate the transfer of data between the processor 502, the memory 504, and other components. In some embodiments, chipset 506 may include two or more integrated circuits (ICs), such as a northbridge controller coupled to the processor 502, the memory 504, and a southbridge controller, with the southbridge controller coupled to the other components such as USB 510, SATA 520, and PCIe buses 508. The chipset 506 may couple to other components through one or more PCIe buses 508.

Some components may be coupled to one bus line of the PCIe buses 508, whereas some components may be coupled to more than one bus line of the PCIe buses 508. One example component is a universal serial bus (USB) controller 510, which interfaces the chipset 506 to a USB bus 512. A USB bus 512 may couple input/output components such as a keyboard 514 and a mouse 516, but also other components such as USB flash drives, touch-based input components, or another information handling system. Another example component is a SATA bus controller 520, which couples the chipset 506 to a SATA bus 522. The SATA bus 522 may facilitate efficient transfer of data between the chipset 506 and components coupled to the chipset 506 and a storage device 524 (e.g., a hard disk drive (HDD) or solid-state disk drive (SDD)) and/or a compact disc read-only memory (CD-ROM) 526. The PCIe bus 508 may also couple the chipset 506 directly to a storage device 528 (e.g., a solid-state disk drive (SDD)). A further example of an example component is a graphics device 530 (e.g., a graphics processing unit (GPU)) for generating output to a display device 532, a network interface controller (NIC) 540, and/or a wireless interface 550 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 506 may also be coupled to a serial peripheral interface (SPI) and/or Inter-Integrated Circuit (I2C) bus 560, which couples the chipset 506 to system management components. For example, a non-volatile random-access memory (NVRAM) 570 for storing firmware 572 may be coupled to the bus 560. As another example, a controller, such as a baseboard management controller (BMC) 580, may be coupled to the chipset 506 through the bus 560. BMC 580 may be referred to as a service processor or embedded controller (EC). Capabilities and functions provided by BMC 580 may vary considerably based on the type of information handling system. For example, the term baseboard management system may be used to describe an embedded processor included at a server, while an embedded controller may be found in a consumer-level device. As disclosed herein, BMC 580 represents a processing device different from processor 502, which provides various management functions for information handling system 500. For example, an embedded controller may be responsible for power management, cooling management, and the like. An embedded controller included at a data storage system may be referred to as a storage enclosure processor or a chassis processor.

System 500 may include additional processors that are configured to provide localized or specific control functions, such as a battery management controller. Bus 560 can include one or more busses, including a Serial Peripheral Interface (SPI) bus, an Inter-Integrated Circuit (I2C) bus, a system management bus (SMBUS), a power management bus (PMBUS), or the like. BMC 580 may be configured to provide out-of-band access to devices at information handling system 500. Out-of-band access in the context of the bus 560 may refer to operations performed prior to execution of firmware 572 by processor 502 to initialize operation of system 500.

Firmware 572 may include instructions executable by processor 102 to initialize and test the hardware components of system 500. For example, the instructions may cause the processor 502 to execute a power-on self-test (POST). The instructions may further cause the processor 502 to load a boot loader or an operating system (OS) from a mass storage device. Firmware 572 additionally may provide an abstraction layer for the hardware, such as a consistent way for application programs and operating systems to interact with the keyboard, display, and other input/output devices. When power is first applied to information handling system 500, the system may begin a sequence of initialization procedures, such as a boot procedure or a secure boot procedure. During the initialization sequence, also referred to as a boot sequence, components of system 500 may be configured and enabled for operation and device drivers may be installed. Device drivers may provide an interface through which other components of the system 500 can communicate with a corresponding device. The firmware 572 may include a basic input-output system (BIOS) and/or include a unified extensible firmware interface (UEFI). Firmware 572 may also include one or more firmware modules of the information handling system. Additionally, configuration settings for the firmware 572 and firmware of the information handling system 500 may be stored in the NVRAM 570. NVRAM 570 may, for example, be a non-volatile firmware memory of the information handling system 500 and may store a firmware memory map namespace 500 of the information handling system. NVRAM 570 may further store one or more container-specific firmware memory map namespaces for one or more containers concurrently executed by the information handling system.

Information handling system 500 may include additional components and additional busses, not shown for clarity. For example, system 500 may include multiple processor cores (either within processor 502 or separately coupled to the chipset 506 or through the PCIe buses 508), audio devices (such as may be coupled to the chipset 506 through one of the PCIe busses 508), or the like. While a particular arrangement of bus technologies and interconnections is illustrated for the purpose of example, one of skill will appreciate that the techniques disclosed herein are applicable to other system architectures. System 500 may include multiple processors and/or redundant bus controllers. In some embodiments, one or more components may be integrated together in an integrated circuit (IC), which is circuitry built on a common substrate. For example, portions of chipset 506 can be integrated within processor 502. Additional components of information handling system 500 may include one or more storage devices that may store machine-executable code, one or more communications ports for communicating with external devices, and various input and output (I/O) devices, such as a keyboard, a mouse, and a video display.

In some embodiments, processor 502 may include multiple processors, such as multiple processing cores for parallel processing by the information handling system 500. For example, the information handling system 500 may include a server comprising multiple processors for parallel processing. In some embodiments, the information handling system 500 may support virtual machine (VM) operation, with multiple virtualized instances of one or more operating systems executed in parallel by the information handling system 500. For example, resources, such as processors or processing cores of the information handling system may be assigned to multiple containerized instances of one or more operating systems of the information handling system 500 executed in parallel. A container may, for example, be a virtual machine executed by the information handling system 500 for execution of an instance of an operating system by the information handling system 500. Thus, for example, multiple users may remotely connect to the information handling system 500, such as in a cloud computing configuration, to utilize resources of the information handling system 500, such as memory, processors, and other hardware, firmware, and software capabilities of the information handling system 500. Parallel execution of multiple containers by the information handling system 500 may allow the information handling system 500 to execute tasks for multiple users in parallel secure virtual environments.

The schematic flow chart diagrams of FIGS. 2 and 3 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system, comprising:
   a memory;
   a processor coupled to the memory, wherein the processor is configured to perform steps comprising:
      receiving an indication to capture a static facsimile of digital content, wherein the indication is associated with a first user;
      capturing the static facsimile of the digital content in accordance with the indication;
      determining an encrypted static facsimile by encrypting the static facsimile; and
      transmitting the encrypted static facsimile and access instructions to an access control device for providing a second user with access to the static facsimile, wherein the access instructions define conditions of the access provided to the second user.

2. The information handling system of claim 1, wherein encrypting the static facsimile includes cryptographically signing the static facsimile with a private key that is associated with a public key, wherein the second user is associated with the public key.

3. The information handling system of claim 1, wherein the conditions include a time at which the access provided to the second user is revoked.

4. The information handling system of claim 1, wherein the conditions include a portion of the static facsimile to which the second user is denied access.

5. The information handling system of claim 1, wherein the operations further include applying a watermark to the static facsimile prior to transmitting the encrypted static facsimile.

6. The information handling system of claim 5, wherein the watermark is a stenographic watermark.

7. The information handling system of claim 1, wherein the digital content is a portion less than all of digital content displayed on a display associated with the first user.

8. The information handling system of claim 1, wherein:
   if upon receiving the indication, an application hosting the digital content has an automation interface, then the static facsimile is captured via an export automation, otherwise the static facsimile is captured via a visual capture automation.

9. A method, comprising:
  receiving an indication to capture a static facsimile of digital content, wherein the indication is associated with a first user;
  capturing the static facsimile of the digital content in accordance with the indication;
  determining an encrypted static facsimile by encrypting the static facsimile; and
  transmitting the encrypted static facsimile and access instructions to an access control device for providing a second user with access to the static facsimile, wherein the access instructions define conditions of the access provided to the second user.

10. The method of claim 9, wherein encrypting the static facsimile includes cryptographically signing the static facsimile with a private key that is associated with a public key, wherein the second user is associated with the public key.

11. The method of claim 9, wherein the conditions include a time at which the access provided to the second user is revoked.

12. The method of claim 9, wherein the conditions include a portion of the static facsimile to which the second user is denied access.

13. The method of claim 9, further comprising applying a watermark to the static facsimile prior to transmitting the encrypted static facsimile.

14. The method of claim 13, wherein the watermark is a stenographic watermark.

15. The method of claim 9, wherein the digital content is a portion less than all of digital content displayed on a display associated with the first user.

16. The method of claim 9, wherein:
  if upon receiving the indication, an application hosting the digital content has an automation interface, then the static facsimile is captured via an export automation,
  otherwise the static facsimile is captured via a visual capture automation.

17. A computer program product, comprising:
  a non-transitory computer readable medium comprising code for performing steps comprising:
    receiving an indication to capture a static facsimile of digital content, wherein the indication is associated with a first user;
    capturing the static facsimile of the digital content in accordance with the indication;
    determining an encrypted static facsimile by encrypting the static facsimile; and
    transmitting the encrypted static facsimile and access instructions to an access control device for providing a second user with access to the static facsimile, wherein the access instructions define conditions of the access provided to the second user.

18. The computer program product of claim 17, wherein encrypting the static facsimile includes cryptographically signing the static facsimile with a private key that is associated with a public key, wherein the second user is associated with the public key.

19. The computer program product of claim 17, wherein the conditions include a time at which the access provided to the second user is revoked or a portion of the static facsimile to which the second user is denied access.

20. The computer program product of claim 17, wherein the operations further comprise applying a steganographic watermark to the static facsimile prior to transmitting the encrypted static facsimile.

* * * * *